US010467672B2

(12) United States Patent
Ainsworth, III et al.

(10) Patent No.: US 10,467,672 B2
(45) Date of Patent: *Nov. 5, 2019

(54) DISPLAYING AN ELECTRONIC PRODUCT PAGE RESPONSIVE TO SCANNING A RETAIL ITEM

(71) Applicant: Comenity LLC, Columbus, OH (US)

(72) Inventors: Richard Barber Ainsworth, III, Dublin, OH (US); Christian Billman, Gahanna, OH (US); Ramesh Korra, Hillard, OH (US)

(73) Assignee: Comenity LLC, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/246,329

(22) Filed: Jan. 11, 2019

(65) Prior Publication Data

US 2019/0147519 A1    May 16, 2019

Related U.S. Application Data

(63) Continuation of application No. 14/626,839, filed on Feb. 19, 2015, now Pat. No. 10,204,368.

(60) Provisional application No. 62/079,444, filed on Nov. 13, 2014.

(51) Int. Cl.
  *G06Q 30/06* (2012.01)
(52) U.S. Cl.
  CPC ..... *G06Q 30/0623* (2013.01); *G06Q 30/0631* (2013.01)

(58) Field of Classification Search
  CPC ............ G06Q 20/322; G06Q 30/0601; G06Q 30/0623; G06Q 30/0629; G06Q 30/0631; G06Q 30/0641; G06Q 30/0643
  See application file for complete search history.

(56) References Cited

U.S. PATENT DOCUMENTS

| | | |
|---|---|---|
| 7,401,734 B1 | 7/2008 | Wan et al. |
| 8,438,052 B1 | 5/2013 | Chanda et al. |
| 10,204,368 B2 * | 2/2019 | Ainsworth, III ... G06Q 30/0623 |
| 10,242,395 B1 * | 3/2019 | Manjunathaiah .. G06Q 30/0623 |
| 2003/0018777 A1 | 1/2003 | Miller et al. |
| 2008/0237340 A1 | 10/2008 | Emmons et al. |
| 2010/0063891 A1 | 3/2010 | Townsend et al. |
| 2010/0070529 A1 | 3/2010 | Gokturk et al. |
| 2011/0004533 A1 | 1/2011 | Soto et al. |
| 2011/0106635 A1 | 5/2011 | Khan et al. |

(Continued)

OTHER PUBLICATIONS

""Cross-sell." OED.com, Oxford English Dictionary, n.d. Web Dec. 21, 2016. http://www.oed.com/view/Entry/250856?redirectedFrom=cross-sell#eid".

(Continued)

*Primary Examiner* — Suezu Ellis (57) ABSTRACT

In a computer-implemented method for displaying an electronic product page responsive to scanning a retail item a retail item is scanned via a scanning device at a location, wherein the scanning device comprises a display screen, and wherein the location is not a point-of-sale at a retail store. In response to scanning the retail item, an electronic product page of said retail item is automatically displayed on the display screen. A user of the scanning device is enabled to purchase the retail item via the electronic product page displayed on the display screen.

20 Claims, 6 Drawing Sheets

(56) References Cited

U.S. PATENT DOCUMENTS

| | | |
|---|---|---|
| 2011/0145051 A1 | 6/2011 | Paradise et al. |
| 2012/0095853 A1 | 4/2012 | Von Bose et al. |
| 2013/0080289 A1 | 3/2013 | Roy et al. |
| 2013/0218721 A1 | 8/2013 | Borhan et al. |
| 2013/0282533 A1 | 10/2013 | Foran-Owens et al. |
| 2014/0180865 A1 | 6/2014 | Argue et al. |
| 2014/0214596 A1 | 7/2014 | Acker, Jr. et al. |
| 2014/0214619 A1 | 7/2014 | Cancro et al. |
| 2014/0244411 A1 | 8/2014 | Kim et al. |
| 2014/0337176 A1 | 11/2014 | Ruvini |
| 2015/0025936 A1 | 1/2015 | Garel et al. |
| 2016/0063588 A1 | 3/2016 | Gadre et al. |
| 2019/0043072 A1* | 2/2019 | Levy .................. G06Q 30/0207 |

OTHER PUBLICATIONS

""Upsell." OED.com, Oxford English Dictionary, n.d. Web Dec. 21, 2016. http://www.oed.com/view/Entry/267465?redirectedFrom=upsell&".

* cited by examiner

```
SCAN A RETAIL ITEM VIA A SCANNING DEVICE AT A LOCATION, WHEREIN
THE SCANNING DEVICE COMPRISES A DISPLAY SCREEN, AND WHEREIN
THE LOCATION IS NOT A POINT-OF-SALE AT A RETAIL STORE
310
```
↓
```
IN RESPONSE TO SCANNING THE RETAIL ITEM, AUTOMATICALLY
DISPLAY AN ELECTRONIC PRODUCT PAGE OF THE RETAIL ITEM ON THE
DISPLAY SCREEN
320
```
↓
```
ENABLE A USER OF THE SCANNING DEVICE TO PURCHASE THE RETAIL
ITEM VIA THE ELECTRONIC PRODUCT PAGE DISPLAYED ON THE DISPLAY
SCREEN
330
```

```
DISPLAY AN ENSEMBLE OF RETAIL ITEMS COMPRISING THE RETAIL ITEM
340
```

```
GENERATE AN ALERT TO ASSIST A USER OF THE SCANNING DEVICE IN
RESPONSE TO SCANNING THE RETAIL ITEM
350
```

```
DISPLAY INVENTORY OF THE RETAIL ITEM WITHIN THE RETAIL STORE VIA
THE ELECTRONIC PAGE OF THE RETAIL ITEM
360
```

```
PLACE THE RETAIL ITEM ON HOLD
370
```

```
GENERATE A RECEIPT FOR ORDER FULFILLMENT OF THE RETAIL ITEM
380
```

```
SCAN A RETAIL ITEM VIA A MOBILE SCANNING DEVICE AT A RETAIL
STORE, WHEREIN THE SCANNING DEVICE COMPRISES A TOUCH DISPLAY
SCREEN, AND WHEREIN THE SCANNING IS NOT ASSOCIATED WITH A
POINT-OF-SALE AT THE RETAIL STORE
410
```

```
IN RESPONSE TO SCANNING THE RETAIL ITEM, AUTOMATICALLY
DISPLAY INVENTORY OF THE RETAIL ITEM IN THE RETAIL STORE VIA AN
ELECTRONIC PRODUCT PAGE OF THE RETAIL ITEM
420
```

```
ENABLE PURCHASE THE RETAIL ITEM VIA THE ELECTRONIC PRODUCT
PAGE DISPLAYED ON THE TOUCH DISPLAY SCREEN
430
```

```
DISPLAY AN ENSEMBLE OF RETAIL ITEMS COMPRISING THE RETAIL ITEM
440
```

```
GENERATE AN ALERT TO ASSIST A USER OF THE SCANNING DEVICE IN
RESPONSE TO SCANNING THE RETAIL ITEM
450
```

```
IN RESPONSE TO UNAVAILABILITY OF THE RETAIL ITEM, DISPLAY
ALTERNATIVE OR SIMILAR RETAIL ITEMS
460
```

ACCESS RETAIL ITEM INFORMATION OF A RETAIL ITEM AT A DEVICE, AND WHEREIN THE RETAIL ITEM INFORMATION IS NOT ASSOCIATED WITH A POINT-OF-SALE AT A RETAIL STORE
510

IN RESPONSE TO ACCESSING THE RETAIL ITEM INFORMATION, AUTOMATICALLY DISPLAY AN ELECTRONIC PRODUCT PAGE OF THE RETAIL ITEM AT THE DEVICE
520

IN RESPONSE TO ACCESSING SCANNED DATA OF THE RETAIL ITEM AT AN E-COMMERCE WEBSITE, AUTOMATICALLY DISPLAYING THE ELECTRONIC PAGE OF THE RETAIL ITEM VIA THE E-COMMERCE WEBSITE
522

FIG. 5

DISPLAYING AN ELECTRONIC PRODUCT PAGE RESPONSIVE TO SCANNING A RETAIL ITEM

CROSS-REFERENCE TO RELATED APPLICATIONS

This application is a continuation of and claims priority to U.S. patent application Ser. No. 14/626,839, filed on Feb. 19, 2015 entitled "DISPLAYING AN ELECTRONIC PRODUCT PAGE RESPONSIVE TO SCANNING A RETAIL ITEM" by Richard Barber Ainsworth III et al., and assigned to the assignee of the present application.

U.S. patent application Ser. No. 14/626,839 claims priority to and benefit of U.S. Provisional Patent Application No. 62/079,444, filed on Nov. 13, 2014 entitled "DISPLAYING AN ELECTRONIC PRODUCT PAGE RESPONSIVE TO SCANNING A RETAIL ITEM" by Richard Barber Ainsworth III et al., and assigned to the assignee of the present application.

BACKGROUND

Oftentimes a customer may visit a retail store and peruse retail items that the customer may be interested in purchasing. However, the customer may leave the store without purchasing any retail items for various reasons. Such reasons for not purchasing an item may be that the items in stock were not in the desired size, color, etc.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Figure 1:
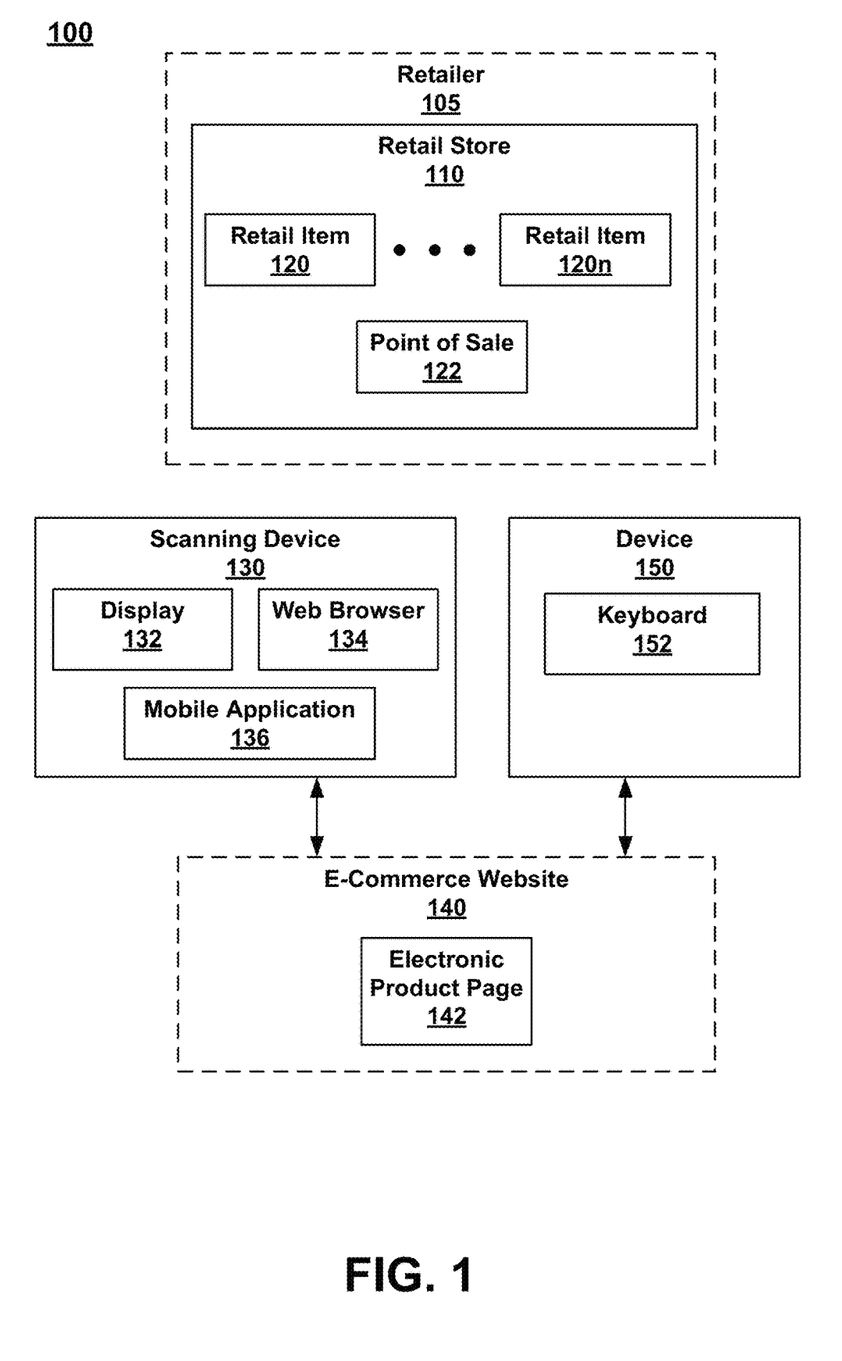
FIG. 1 is a block diagram that illustrates an embodiment of a shopping system.

FIG. 1 depicts an embodiment of a shopping system or "system" 100. System 100 includes various retail items (e.g., retail items 120 through 120n) that are located in retail store 110. The retail items are available for purchase by customers visiting retail store 110.

Retail items (e.g., retail items 120 through retail item 120n) can be but are not limited to, clothing, shoes, glasses, hats, jewelry, accessories, etc. In various embodiments, at least some of the retail items are items of a retail collection or fashion/clothing line provided by a retailer.

The retail items, such as apparel, in one embodiment, are provided by a single retailer, wherein retail store 110 is the brick-and-mortar store for the single retailer. For example, retail store 110 is owned and managed by retailer 105.

As described above, a customer may visit retail store 110 and peruse retail items. However, the customer may leave retail store 110 without purchasing any retail items for various reasons. For example, the customer was interested in purchasing retail item 120. However, retail item 120 was a large size and the customer wears a medium size. As a result, the customer left retail store 110 without purchasing retail item 120.

As will be described in further detail below, system 100 enables a customer to scan a retail item to facilitate in the purchase of such item. That is, system 100 facilitates to increase conversion of a customer purchasing retail items while shopping in retail store 110. Alternatively, system 100 enables a customer to manually enter information to facilitate in the purchase of such item.

In general, in one embodiment, a retail item is scanned by scanning device 130. In response to scanning the retail item, electronic product page 142 of the scanned retail item is displayed on scanning device 130. As a result, interactive display of electronic product page 142 enhances the customer's shopping experience and may facilitate in the purchase of the scanned retail item.

Scanning device 130 is any computing device that is able to scan a retail item (e.g., retail item 120). Scanning device 130 can be but is not limited to, a smart phone, tablet computing device, personal digital assistant (PDA), hand-held scanner, scanner attached to a Kiosk, digital signage, etc.

Scanning device 130 may be the property of the retailer or customer perusing retail items in retail store 110. Scanning device 130, in one embodiment, is provided or owned by a third party. For example, a party that manages the purchases of items via system 100.

Scanning device 130 may scan retail item according to various implementations. For example, scanning device 130 is able to scan a barcode (e.g., Universal Product Code (UPC), quick response (QR) code, etc.) associated with or attached to the retail item. The information scanned from the barcode is utilized to display electronic product page 142 of the scanned retail item onto display 132.

In another example, scanning device 130 includes an imager or camera that is able to capture an image of text associated with the retail item. For example, the retail item includes text on a tag attached to the retail item. Scanning device 130 includes optical character recognition (OCR) capabilities. As such, the text captured by the camera of scanning device 130 is transformed into machine-encoded/ computer-readable text. The scanned text of the retail item is utilized to display electronic product page 142 of the scanned retail item onto display 132.

In a further example, scanning device 130 captures an image of the retail item and the image captured by scanning device 130 is matched with the scanned retail item. That is, various images of retail items are stored in a database and captured images of the retail items are compared with the stored images to determine if there is a match between the stored images and the captured images. The electronic product page 142 associated with the scanned retail item is displayed if there is a match between the captured image of the retail item and the stored image.

In another embodiment, scanning device 130 is enabled to access signals emitted from a retail item. For example, retail item 120 emits a signal by various means (e.g., field communication (NFC), Bluetooth, Bluetooth LTE, Radio frequency identification (RFID), etc.). When scanning device 130 is within range of the emitted signals, the scanning device accesses the signals and is able to identify the retail item that is transmitting the captured signals. As a result, the electronic product page 142 associated with accessed signals of the retail item is displayed on scanning device 130.

It should be appreciated that the term "scanning," as described herein is any identification of a retail item by a computing/imaging device. For example, scanning a barcode or the like that is associated with a retail item. In one embodiment, scanning of retail item includes accessing the retailer's identifying codes that translate physical inventory tags to a web item identification.

Alternatively, information associated with the retail item is manually provided or entered by a customer. As a result, the electronic product page 142 associated with the retail item is displayed.

For example, if a scanning device is not available or not functioning, a user may enter information related to a retail item (e.g., UPC code) via keyboard 152 on device 150.

In response, to receiving retail item information entered by a user (e.g., UPC code), the electronic product page 142 associated with the retail is displayed at input device 150.

Device 150 may be a mobile device with the same functionality as scanning device 130 (except for scanning capabilities), as described herein. For instance, device 150 includes a display, web browser, and mobile application similar to scanning device 130 and described herein.

Scanning device 130, in one embodiment, may include an input feature (e.g., keyboard or virtual keyboard), that allows a user to enter information related to a retail item (e.g., UPC code) via the input feature. As a result, the electronic product page 142 associated with the retail item is displayed, as described herein.

It should be appreciated that any functionality regarding the scanning of retail item may be alternatively provided by manual entry of information by a user, for example, via input device 150.

The scanning of the retail item is not required to be at the point of sale (POS) 122. Typically, at POS 122 the retailer calculates the amount owed by the customer and provides options for the customer to make a payment. The merchant will also normally issue a receipt for the transaction at POS 122.

The scanning, in one embodiment, is performed by the customer at any arbitrary location in retail store 110 (but not required to be at POS 122). For example, the customer brings retail item 120 (e.g., a shirt) to the changing room to try on the retail item. The customer realizes the retail item is the incorrect size and subsequently scans the retail item with the customer's personal smart phone. As a result, electronic product page 142 of the scanned item is displayed on the touch display screen of the customer's personal smart phone.

In one embodiment, electronic product page 142 of the scanned retail item is the product page of an e-commerce website 140. That is, electronic page 142 of the scanned item is the e-commerce (or web) content of the e-commerce site which is displayed via web browser 134 executing on scanning device 130. For example, the customer scans shoes via scanning device 130. In response to identifying the scanned shoes via the scanning device, the product page of the scanned shoes of the e-commerce site is displayed on scanning device 130.

The customer is then able to purchase the scanned retail item by interacting with the electronic product page of the e-commerce website. The customer may purchase the item via scanning device 130 while in retail store (and not at POS 122).

E-commerce website 140 may be the e-commerce website for retailer 105. In another embodiment, e-commerce website 140 is a website of an aggregator of retail items. For example, e-commerce website 140 is an approved aggregator of the retailer of the scanned retail item and the aggregator displays items from various unaffiliated retailers.

In another embodiment, electronic product page 142 is stand-alone and is not required to be web content. For example, electronic scanning device 130 is a smart phone that includes mobile application 136 (e.g., a mobile application of retailer 105). In response to scanning and identifying the scanned retail item, electronic product page 142 is displayed via mobile application 136 (which is not associated with web content). From the electronic product page 142 via mobile application 136 the customer is able to purchase the scanned retail item.

Electronic product page 142 may include the inventory of the scanned item. For example, if shirt is scanned, then electronic product page 142 of the scanned item indicates the number of the scanned items including variations (e.g., size, color, etc.) are located within retail store 110.

Electronic product page 142 may include various inventory information. For example, system 100 may include or be communicatively coupled to an inventory system that identifies if an item is available. If so, then electronic product page 142 indicates where the item is available, such as where online, nearby stores. Additionally, electronic product page 142 enables a user to order the item (via the product page) and have the item delivered to the user.

In one embodiment, if an item is not available for purchase at a first retail store (such as a retail store where the user is presently shopping), then the user may purchase the item at a second retail store where the item is in inventory, via the electronic product page. The user may then pick up the purchased item at the second retail store.

In another embodiment, if an item is not available for purchase at a first retail store (such as a retail store where the user is presently shopping), then the use may put the item on hold at a second retail store where the item is in inventory, via the electronic product page. The user may then purchase the item at the second retail store.

In various embodiments, electronic product page 142 and/or the contents of the electronic product page may be provided by various means. For example, a link to the electronic product page and/or the contents of the electronic product page may be provided as a text or email to the user.

Additionally, the information presented in electronic product page 142 may be stored and made available to the customer at a later time. For example, the information may be provided via an email, text, browser bookmark, shopping cart or wishlist, etc.

An alert is generated in response to scanning of a retail item. For example, if a retail item 120 is scanned in retail store 110, an alert is generated and presented to a store associate. The alert may indicate the location where the scanning occurred and which item was scanned. The associate may then locate the customer who scanned the item and directly help the customer.

In one embodiment, scanning device 130 is at a kiosk within retail store 110. For example, a user brings retail item 120 the kiosk and scans retail item 120 via scanning device 130 associated or integrated with the kiosk. In response to the scanning, electronic product page 142 is displayed via display 132 that is associated or integrated with the kiosk.

The user, in one embodiment, may view or purchase the item via the electronic product page, for example, at the kiosk. The user may then print a paper voucher or receipt of the product at the kiosk and provide the voucher or receipt to a store associate for order fulfillment.

The scanning functionality, as described herein, may be utilized by the retailer e-commerce site. For example, a user scans an item at the kiosk which is communicatively coupled to the retailer e-commerce website 140. The electronic product page 142 is then displayed at the kiosk to be viewed by the user.

In particular, e-commerce website 140 is able to access information provided by scanning device 130. In one embodiment, e-commerce website 140 is able to access information provided by scanning device 130 by utilizing inline Frame (iFrame). In general, iFrame element allows one HTML document to be embedded within another HTML document.

An ensemble of items may be presented to the customer via scanning device 130 (or alternatively device 150). An ensemble is a collection of coordinated items that are fashionable and desirable for purchase by others. The ensemble typically includes colors, styles, patterns, materials, etc., and a combination thereof, that are currently fashionable and desirable to be worn by others.

In one embodiment, a link is provided to the user, wherein the link is to the ensemble of items. In such an embodiment, the link is to a location where there are various ensembles created that include the scanned item.

In another embodiment, alternate recommendations are provided to the user if the intended item is not available. For example, if a user scans (or enters) retail item 120 and retail item is not available (e.g., sold out or back ordered), then an alternate retail item is presented to the user. In particular, if a user scans a large blue shirt (and it is not available), then a similar blue shirt or various other shirts of a similar style are presented to the user.

Figure 2A:
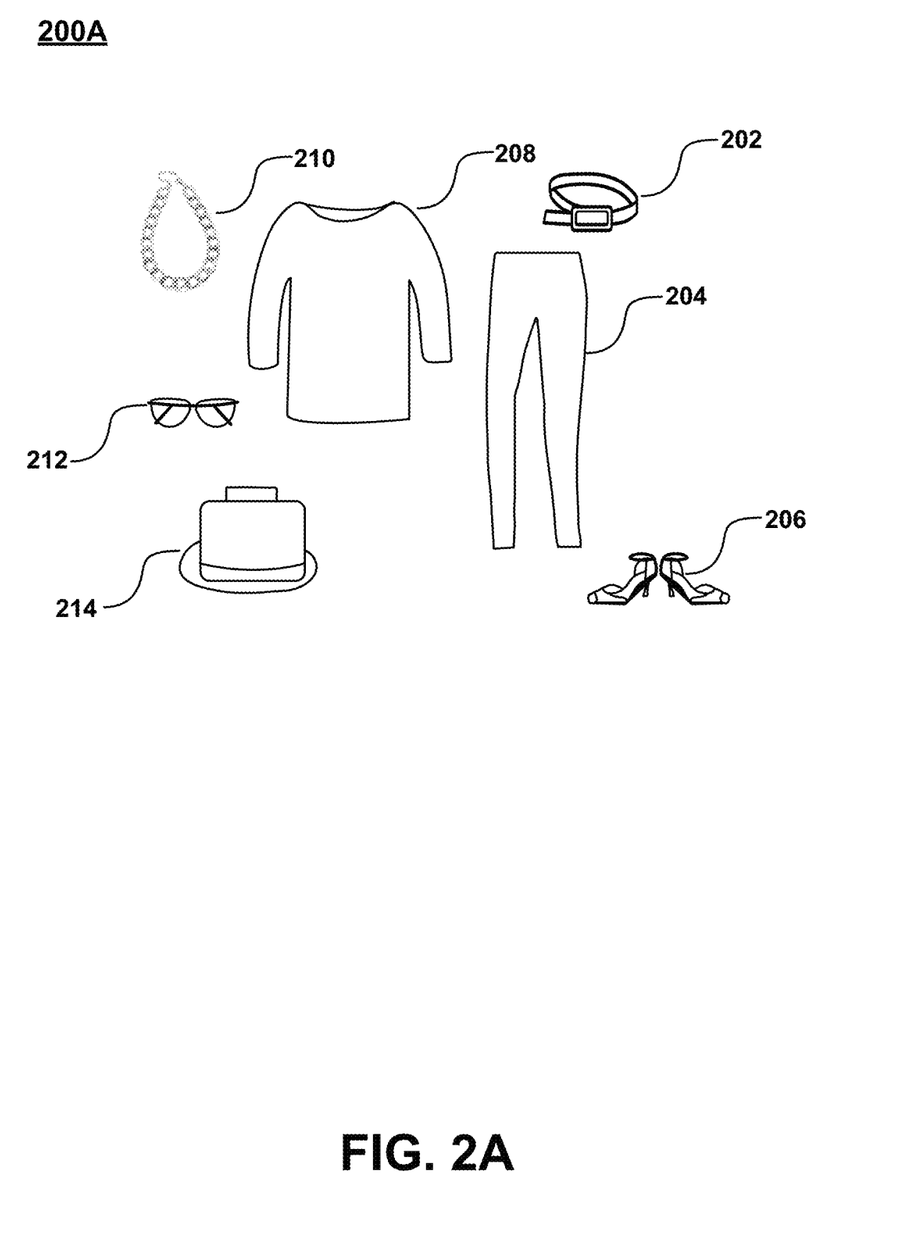
FIG. 2A is a block diagram that illustrates an embodiment of an ensemble.

FIG. 2A depicts an embodiment of an ensemble 200A of retail items that are suggested to the customer upon scanning a retail item. For example, a customer scans shirt 208 via scanning device 130. In response to scanning shirt 208, an ensemble 200 of retail items is presented to the customer. In such an example, belt 202, pants 204, shoes 206, necklace 210, glasses 212 and bag 214 are displayed to the customer via display 132. As a result, the customer is automatically provided additional retail items that would be of interest to the customer.

Figure 2B:
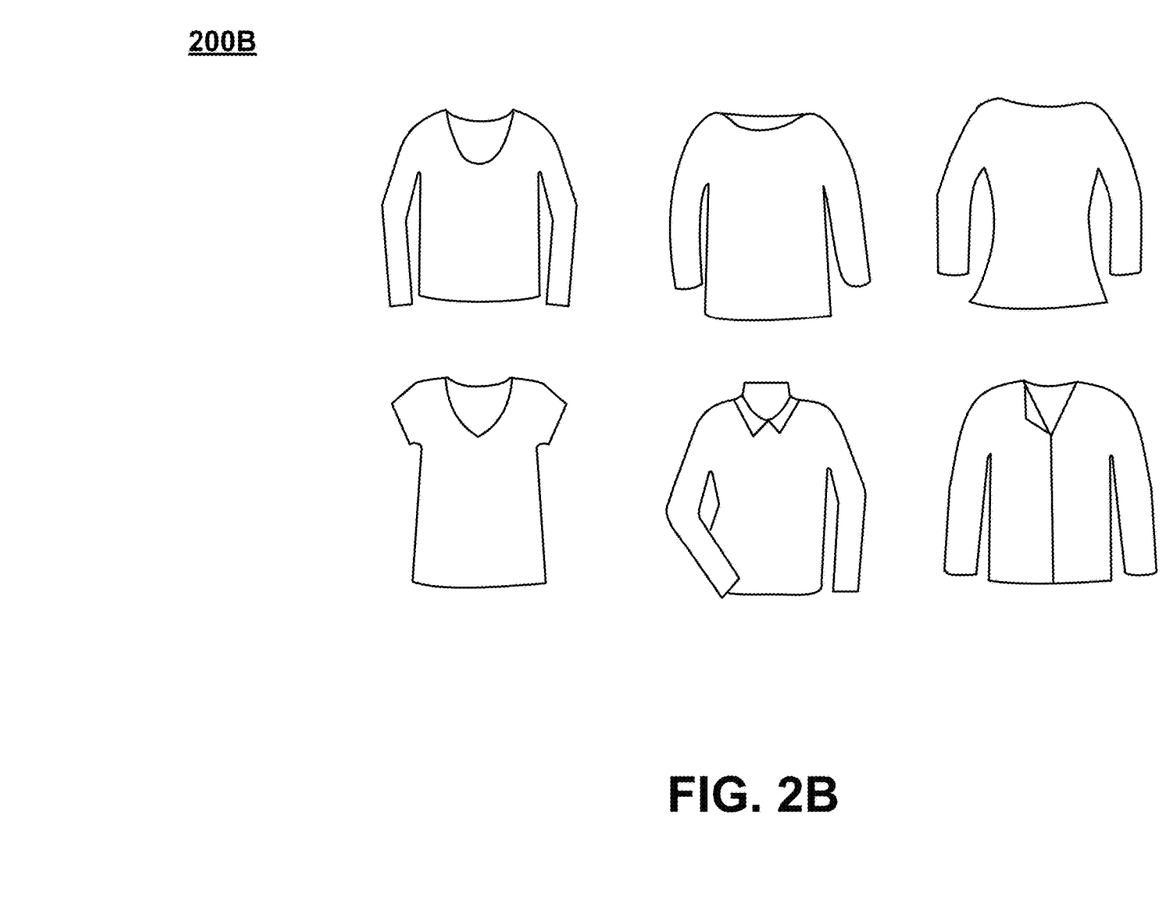
FIG. 2B is a block diagram that illustrates an embodiment of alternative retail items.

FIG. 2B depicts an embodiment of alternative retail items 200B that are suggested to a customer upon scanning a retail item and the retail item is unavailable. For example, a retail item such as a shirt is scanned. However, the retail item is unavailable for purchase at the time the item is scanned.

Accordingly, a variety of alternative retail items 200B are presented to the user for purchase. In one embodiment, alternative retail items 200B includes various shirts that are similar to (e.g., size, color, style, etc.) to the scanned retail item.

EXAMPLE METHODS OF OPERATION

Figure 3:
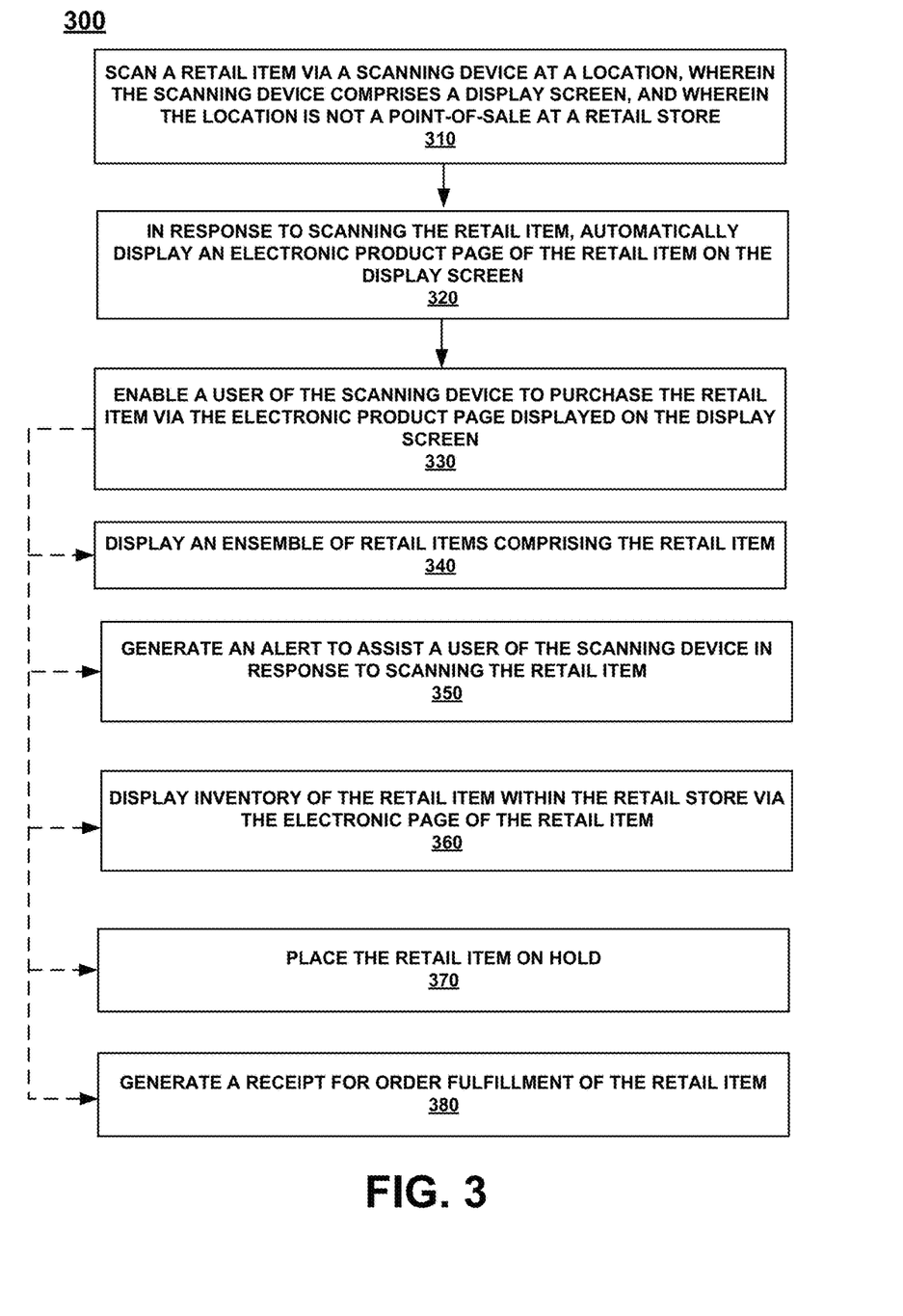
FIG. 3 depicts a flow diagram for a method for displaying an electronic product page responsive to scanning a retail item, according to various embodiments.
Figure 4:
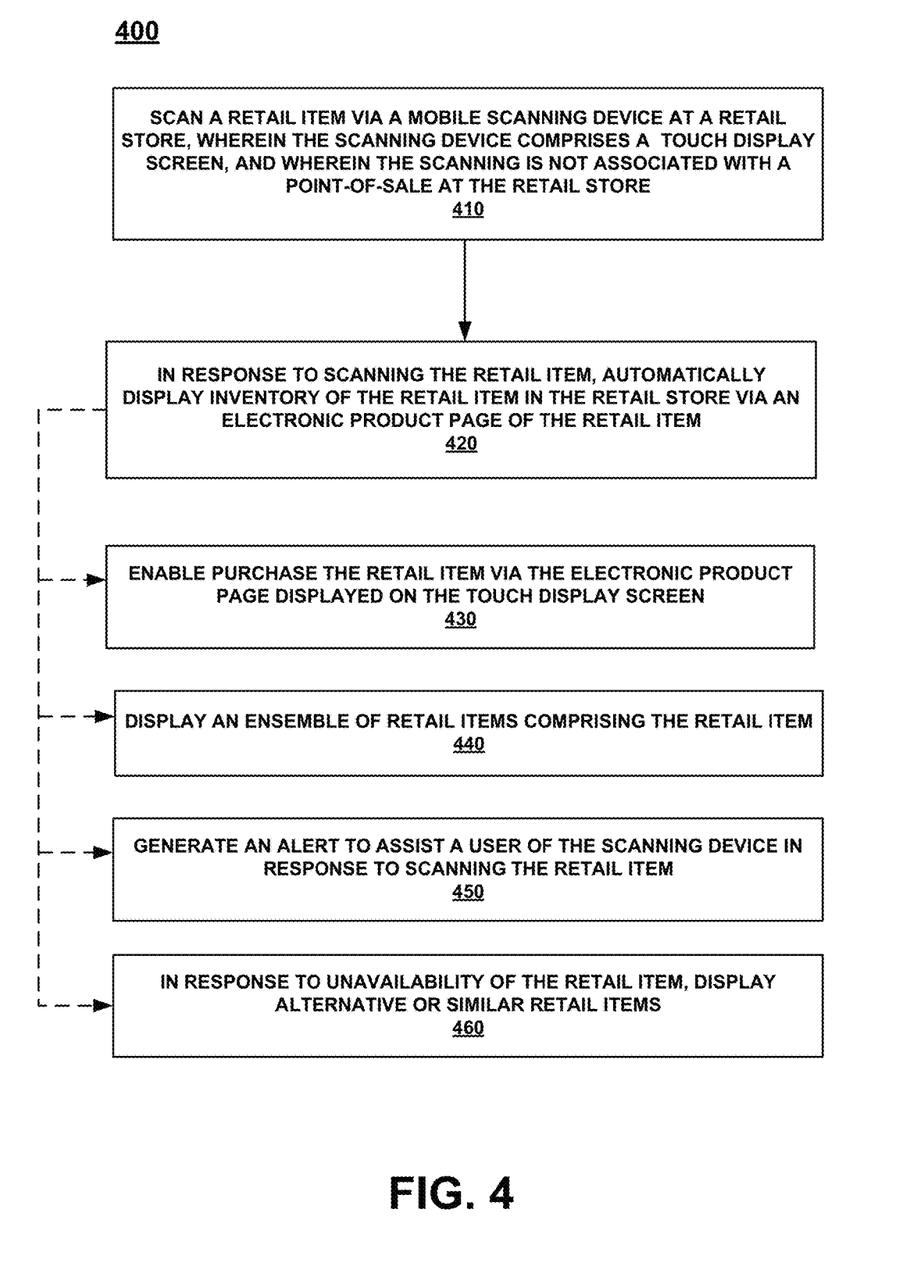
FIG. 4 depicts a flow diagram for a method for displaying an electronic product page responsive to scanning a retail item, according to various embodiments.
Figure 5:
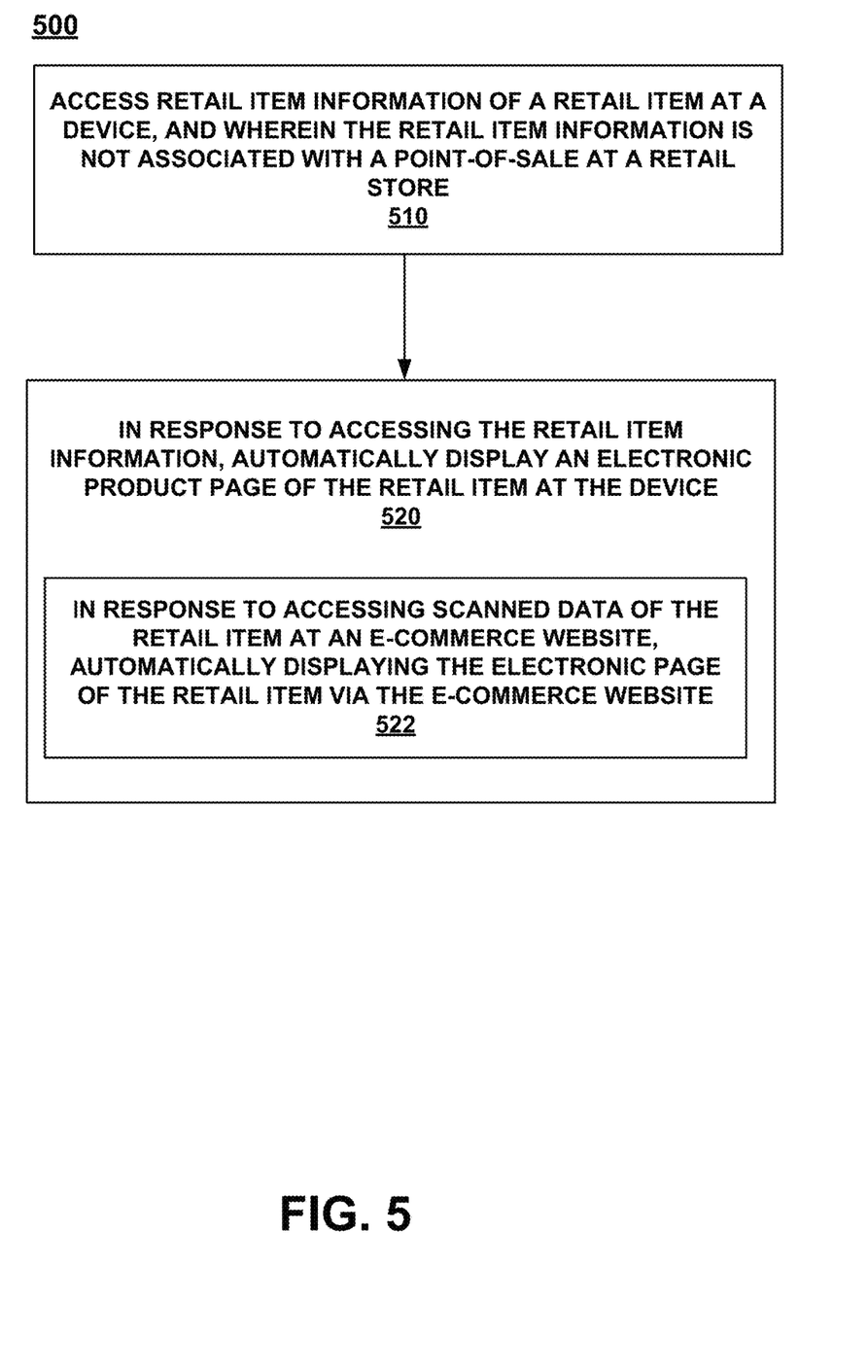
FIG. 5 depicts a flow diagram for a method for displaying an electronic product page, according to various embodiments.

The following discussion sets forth in detail the operation of some example methods of operation of embodiments. With reference to FIGS. 3, 4 and 5, flow diagrams 300, 400 and 500 illustrate example procedures used by various embodiments. Flow diagrams 300-500 include some procedures that, in various embodiments, are carried out by a processor under the control of computer-readable and computer-executable instructions. In this fashion, procedures described herein and in conjunction with flow diagrams 300-500 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments and/or cloud environments. The computer-readable and computer-executable instructions, which reside on tangible computer readable storage media, are used to control or operate in conjunction with, for example, one or some combination of processors of the computer environments and/or cloud environment. It is appreciated that the processor(s) may be physical or virtual or some combination (it should also be appreciated that a virtual processor is implemented on physical hardware). Although specific procedures are disclosed in flow diagrams 300-500, such procedures are examples. That is, embodiments are well suited to performing various other procedures or variations of the procedures recited in flow diagrams 300-500. Likewise, in some embodiments, the procedures in flow diagrams 300-500 may be performed in an order different than presented and/or not all of the procedures described in one or more of these flow diagrams may be performed. It is further appreciated that procedures described in flow diagrams 300-500 may be implemented in hardware, or a combination of hardware with firmware and/or software.

FIG. 3 depicts a process flow diagram 300 for a method for displaying an electronic product page responsive to scanning a retail item, according to various embodiments.

At 310 of method 300, a retail item is scanned via a scanning device at a location, wherein the scanning device comprises a display screen, and wherein the location is not a point-of-sale at a retail store. For example, a customer located in retail store 110 is interested in purchasing retail item 120. However, retail item 120 is the incorrect size for the customer (and the customer cannot find the correct size of retail item 120 within store 110). The customer then scans a bar code or any identifying item of retail item 120 via scanning device 130 which is the customer's personal smart phone. Additionally, the customer scans the retail item within retail store at a location other than point of sale 122.

At 320, in response to scanning the retail item, an electronic product page of the retail item is automatically displayed on the display screen. For example, when the customer scans retail item 120 via scanning device 130, then the e-commerce page of retail item 120 is automatically displayed on display 132.

At 330, user of the scanning device is enabled to purchase the retail item via the electronic product page displayed on the display screen. For example, while the customer is in retail store 110, the user is able to purchase retail item 120 directly from electronic product page of retail item 120 displayed on display 132.

At 340, an ensemble of retail items comprising the retail item is displayed. For example, in response to scanning retail item such as shirt 208, an ensemble 200A of items is created and displayed to the customer.

At 350, an alert to assist a user of the scanning device is generated in response to scanning the retail item. For example, responsive to a retail item being scanned through a mobile application of the retailer, an alert is generated and presented to an associate within retail store 110. The alert can be in various forms, such as a text, email, etc. The alert can depict various information such as, but not limited to, item scanned, location, time of scan, etc.

At 360, inventory of the retail item within the retail store is displayed via the electronic page of the retail item. For example, retail item 120 is scanned by scanning device 130. In response to the scanning, the inventory of retail item 120 with respect to retail store 110 is displayed on display 132.

At 370, the retail item is placed on hold. For example, retail item is scanned by scanning device 130 (or information entered into device 150) while a user at retail store 110. The inventory information provided on the electronic product page indicates that the scanned item is not available at the retail store. However, the inventory information indicates that the retail item is in stock at a nearby retail store. The user then places the retail item on hold, via the electronic product page, at the nearby retail store.

At 380, a receipt for order fulfillment of the retail item is generated. For example, a user purchases an item through the electronic product page of the item. The user then prints out the receipt, for example, at a kiosk at the retail store. The user then presents the printed receipt to a store associate to fulfill the order.

It is noted that any of the procedures, stated above, regarding flow diagram 300 may be implemented in hardware, or a combination of hardware with firmware and/or software. For example, any of the procedures are implemented by a processor(s) of a cloud environment and/or a computing environment.

FIG. 4 depicts a process flow diagram 400 for a method for displaying an electronic product page responsive to scanning a retail item, according to various embodiments.

At 410, a retail item is scanned via a mobile scanning device at a retail store, wherein the scanning device comprises a touch display screen, and wherein the scanning is not associated with a point-of-sale at the retail store. For example, a customer at retail store 110 is interested in purchasing retail item 120. However, retail item 120 is the incorrect size for the customer (and the customer cannot find the correct size of retail item 120 within store 110). The customer then scans retail item 120 via scanning device 130. Additionally, the customer scans the retail item within retail store at a location other than point of sale 122.

At 420, in response to scanning the retail item, inventory of the retail item in the retail store is automatically displayed via an electronic product page of the scanned retail item. For example, responsive to scanning retail item 120, inventory of the scanned item respective to retail store 110 is displayed via scanning device 130.

At 430, purchase of the retail item is enabled via the electronic product page displayed on the touch display screen. For example, while the customer is in retail store 110, the user is able to purchase retail item 120 directly from electronic product page of retail item 120 displayed on display 132.

At 440, an ensemble of retail items comprising the retail item is displayed. For example, in response to scanning retail item such as shirt 208, an ensemble 200A of items is created and displayed to the customer.

At 450, an alert is generated to assist a user of the scanning device in response to scanning the retail item For example, responsive to a retail item being scanned through a mobile application of the retailer, an alert is generated and presented to an associate within retail store 110. The alert can be in various forms, such as a text, email, etc. The alert can depict various information such as, but not limited to, item scanned, location, time of scan, etc.

At 460, in response to unavailability of the retail item, alternative or similar retail items are displayed. For example, if a user scans an item and if an item is not in stock for purchase, then alternative or similar retail items are displayed to the user, for example, on display 132. More particularly, if a user scans a shirt, then alternative retail items 200B (or similar retail items) are presented to the user. The alternative or similar items may be items that have a similar color, style, etc.

It is noted that any of the procedures, stated above, regarding flow diagram 400 may be implemented in hardware, or a combination of hardware with firmware and/or software. For example, any of the procedures are implemented by a processor(s) of a cloud environment and/or a computing environment.

FIG. 5 depicts a process flow diagram 500 for a method for displaying an electronic product page, according to various embodiments.

At 510, retail item information of a retail item is accessed at a device, and wherein the retail item information is not associated with a point-of-sale at a retail store. For example, scanning device 130 scans a retail item. Alternatively, a user enters retail item information at device 150 via keyboard 152 (or into scanning device 130 via a keyboard). The retail item information is not required to be scanned/entered at or associated with a point-of-sale at the retail store.

At 520, in response to accessing the retail item information, an electronic product page of the retail item is automatically displayed at the device. For example, electronic product page 142 of the retail item is automatically displayed on scanning device 130 (or device 150).

At 522, in one embodiment, in response to accessing scanned data of the retail item at an e-commerce website, the electronic page of the retail item is automatically displayed via the e-commerce website. For example, while at a kiosk, a user scans a retail item. The scanned information is transmitted to the e-commerce website of the retail store. The e-commerce website accesses the scanned information and processes it such that the electronic product page of the scanned item is displayed.

Example embodiments of the subject matter are thus described. Although various embodiments of the have been described in a language specific to features and/or methodological acts, it is to be understood that the appended claims are not necessarily limited to the specific features or acts described above. Rather, the specific features and acts described above are disclosed as example forms of implementing the claims and their equivalents. Moreover, examples and embodiments described herein may be implemented alone or in various combinations with one another.

What is claimed is:

1. A computer-implemented method comprising:
scanning a wearable retail item via a scanning device at a retail store, wherein said scanning device comprises a touch display screen, and wherein said scanning is not associated with a point-of-sale at said retail store;
displaying an ensemble of wearable retail items corresponding to said wearable retail item,
the ensemble of wearable retail items comprising a plurality of coordinated wearable retail items, each of the plurality of coordinated wearable retail items being different than, but coordinated with, the wearable retail item;
displaying, on the touch display screen, a link to the ensemble of wearable retail items,
the link providing a location where the ensemble of wearable retail items,
including the wearable retail item, can be found; and
purchasing, via the touch display screen and based on customer input to the electronic product page, at least one of said wearable retail item of said ensemble of wearable retail items while in said retail store and not at said point-of-sale of said retail store.

2. The computer-implemented method of claim 1, further comprising:
automatically displaying, on the touch display screen, inventory of said wearable retail item in said retail store via an electronic product page of said wearable retail item.

3. The computer-implemented method of claim 1, where said scanning a retail item comprises:
scanning a barcode attached to said retail item.

4. The computer-implemented method of claim 1, where said scanning a retail item comprises:
performing an optical character recognition (OCR) of text associated with said retail item.

5. The computer-implemented method of claim 1, where said scanning a retail item comprises:
performing an image matching process to identify said retail item.

6. The computer-implemented method of claim 1, where said scanning a retail item comprises:
receiving a transmitted signal emitted from a transmitter coupled with said retail item.

7. The computer-implemented method of claim 1, wherein a web browser displays said electronic product page from an electronic commerce site.

8. The computer-implemented method of claim 1, wherein said electronic product page is displayed via a web application executed on a mobile device.

9. The computer-implemented method of claim 1, further comprising:
placing, via the touch display screen and based on customer input to the electronic product page, a hold on at least another of a wearable retail item of said ensemble of wearable retail items while in said retail store and not at said point-of-sale of said retail store.

10. A non-transitory computer-readable storage medium having instructions embodied therein that when executed cause a computer system to perform a method comprising:
scanning a wearable retail item via a scanning device at a retail store, wherein said scanning device comprises a touch display screen, and wherein said scanning is not associated with a point-of-sale at said retail store;
displaying an ensemble of wearable retail items corresponding to said wearable retail item,
the ensemble of wearable retail items comprising a plurality of coordinated wearable retail items, each of the plurality of coordinated wearable retail items being different than, but coordinated with, the wearable retail item;
displaying, on the touch display screen, a link to the ensemble of wearable retail items,
the link providing a location where the ensemble of wearable retail items,
including the wearable retail item, can be found;
automatically displaying, on the touch display screen, inventory of said wearable retail item in said retail store via an electronic product page of said wearable retail item; and
purchasing, via the touch display screen and based on customer input to the electronic product page, at least one of said wearable retail item of said ensemble of wearable retail items while in said retail store and not at said point-of-sale of said retail store.

11. The non-transitory computer-readable storage medium of claim 10, where said scanning a retail item comprises:
scanning a barcode attached to said retail item.

12. The non-transitory computer-readable storage medium of claim 11, where said scanning a retail item comprises:
performing an optical character recognition (OCR) of text associated with said retail item.

13. The non-transitory computer-readable storage medium of claim 11, where said scanning a retail item comprises:
performing an image matching process to identify said retail item.

14. The non-transitory computer-readable storage medium of claim 11, where said scanning a retail item comprises:
receiving a transmitted signal emitted from a transmitter coupled with said retail item.

15. The non-transitory computer-readable storage medium of claim 11, further comprising:
placing, via the touch display screen and based on customer input to the electronic product page, a hold on at least another of a wearable retail item of any of said ensemble of wearable retail items while in said retail store and not at said point-of-sale of said retail store.

16. A mobile device comprising:
a scanner to scan a wearable retail item at a retail store, wherein said scan is not associated with a point-of-sale at said retail store;
a display screen to
display an ensemble of wearable retail items corresponding to said wearable retail item,
the ensemble of wearable retail items comprising a plurality of coordinated wearable retail items, each of the plurality of coordinated wearable retail items being different than, but coordinated with, the wearable retail item;
display a link to the ensemble of wearable retail items, the link providing a location where the ensemble of wearable retail items, including the wearable retail item, can be found;
display inventory of said wearable retail item in said retail store via an electronic product page of said wearable retail item; and
display a purchase link; and a processor to perform a purchase, based on customer input, of at least one of said wearable retail item of said ensemble of wearable retail items,
the purchase is performed while in said retail store and not at said point-of-sale of said retail store.

17. The mobile device of claim 16, where said scanner is an optical device to scan a barcode attached to said retail item.

18. The mobile device of claim 17, where said optical device performs an optical character recognition (OCR) of text associated with said retail item.

19. The mobile device of claim 17, where said scanner is an optical device to obtain an image of said retail item; and
the processor performs an image matching process on the image of the retail item to identify said retail item.

20. The mobile device of claim 16, where said scanner is a digital signal receiver to receive a digital signal emitted from a transmitter coupled with said retail item.

* * * * *